United States Patent
Gross et al.

(10) Patent No.: US 7,130,275 B2
(45) Date of Patent: Oct. 31, 2006

(54) EXTENDED AUTOMATIC PROTECTION SWITCHING ARRANGEMENT

(75) Inventors: Joel L. Gross, Gilbert, AZ (US); Gregory C. Ladden, Vernon Hills, IL (US); Karl E. Miller, Chandler, AZ (US); Stephen S. Sawyer, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 470 days.

(21) Appl. No.: 10/463,745

(22) Filed: Jun. 16, 2003

(65) Prior Publication Data
US 2004/0252645 A1    Dec. 16, 2004

(51) Int. Cl.
*G06F 11/00* (2006.01)

(52) U.S. Cl. .................... 370/242; 370/225; 370/216; 714/11

(58) Field of Classification Search .............. None
See application file for complete search history.

(56) References Cited

U.S. PATENT DOCUMENTS

| | | | | |
|---|---|---|---|---|
| 5,073,774 A | * | 12/1991 | Ikawa | 370/228 |
| 5,484,571 A | * | 1/1996 | Pentoney et al. | 422/82.08 |
| 5,485,571 A | * | 1/1996 | Menon | 714/7 |
| 5,839,064 A | * | 11/1998 | Foti | 455/413 |
| 5,859,895 A | * | 1/1999 | Pomp et al. | 379/9.05 |
| 6,038,456 A | * | 3/2000 | Colby et al. | 455/456.1 |
| 6,219,336 B1 | * | 4/2001 | Takahashi et al. | 370/228 |
| 6,317,426 B1 | | 11/2001 | Afanador et al. | |
| 6,330,168 B1 | | 12/2001 | Pedoeem et al. | |
| 6,353,593 B1 | | 3/2002 | Chen et al. | |
| 6,359,565 B1 | | 3/2002 | Pedoeem et al. | |
| 6,359,858 B1 | * | 3/2002 | Smith et al. | 370/217 |
| 6,477,167 B1 | | 11/2002 | Wu | |
| 6,498,792 B1 | | 12/2002 | Johnson et al. | |
| 6,501,758 B1 | | 12/2002 | Chen et al. | |
| 6,567,401 B1 | * | 5/2003 | Kim | 370/469 |
| 6,590,864 B1 | * | 7/2003 | Suzuki | 370/225 |
| 6,870,860 B1 | * | 3/2005 | Meagher et al. | 370/535 |
| 6,891,836 B1 | * | 5/2005 | Chen et al. | 370/395.51 |
| 7,027,390 B1 | * | 4/2006 | Wakai et al. | 370/218 |

* cited by examiner

*Primary Examiner*—Steven Nguyen
(74) *Attorney, Agent, or Firm*—Frank J. Bogacz; Kevin D. Wills

(57) ABSTRACT

An automatic protection arrangement for a communication system (100) provides a working line terminal equipment (300 and a link (1A) for transmitting bearer traffic from a number of bearer payload processors (50-N) to a switching center (10). The arrangement also has a protection line terminal equipment (35) and link (2A) coupled to the switching center (10). For detected faults, an instantaneous switch over occurs of the bearer traffic of the bearer payload processors (50-N) from the working line terminal equipment (30) to the protection line terminal equipment (35).

1 Claim, 2 Drawing Sheets

EXTENDED AUTOMATIC PROTECTION SWITCHING ARRANGEMENT

BACKGROUND OF THE INVENTION

The present invention pertains to communication system failures and more particularly to automatic protection switching in such communication systems.

Communication system traffic is routed to a central point to perform the data transfer and switching functions. This central point is a mobile switching center. The mobile switching center is typically coupled to a digital cross connect switch on E1 or T1 links. The digital cross connect switch aggregates multiple T1/E1 interfaces to the optical SONET/SDH interfaces terminating at the network element. These features may be embedded into a single product which is sold by mobile switching system manufacturers.

Typically line equipment is coupled to the digital cross connect switch via OC3 links. These OC3 links may run considerable distances, for example.

All too frequently, these lines or fiber connections are severed by backhoes or other digging equipment and are covered by automatic protection switching standards. Automatic protection switching standards have been implemented into communication systems in order to alleviate the problems with failures due to lines being severed. Today's competitive markets demand that communication systems provide near continuous functionality. Therefore it is imperative that 99.999 percent of the time that the communication system smoothly handle data transmission.

Automatic protection switching typically uses two OC3 fibers to couple a particular piece of line equipment to a digital cross connect switch or to the mobile switching center in either a 1+1 or 1:N redundancy mode. In that manner if one of the links or cables is severed, the other one may survive and be able to provide full services for data transmission seamlessly. However, a digging accident may sever both OC3 links providing the working and protection services for a particular piece of line equipment. In addition, the line termination equipment itself may fail.

Accordingly, it would be highly desirable to have an arrangement to provide a seamless protection arrangement for faults due to OC3 cabling as well as protection for line termination equipment failure.

DESCRIPTION OF THE PREFERRED EMBODIMENT OF THE INVENTION

Figure 1:
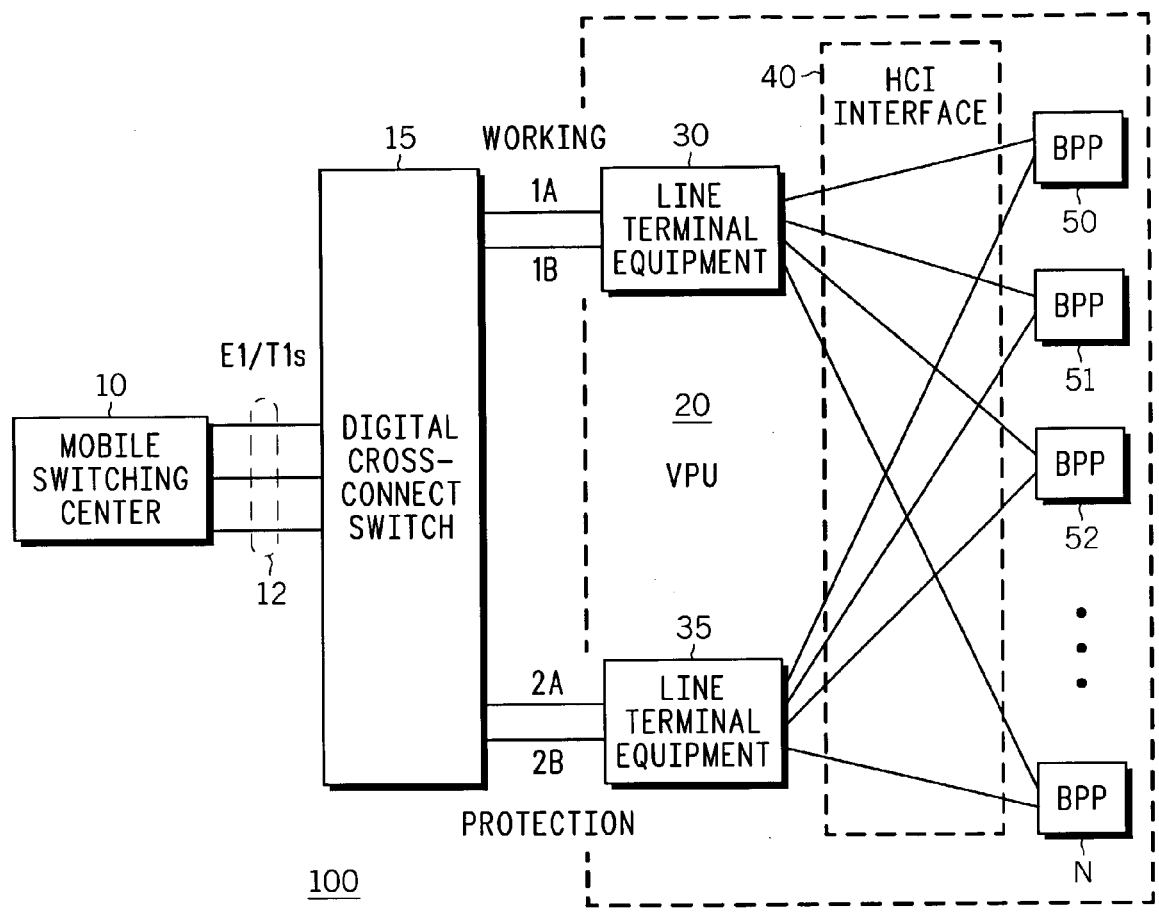
FIG. 1 is a block diagram of a communication system in accordance with the present invention.

Referring to FIG. 1, a block diagram of a communication system 100 embodying the automatic protection switching in accordance with the present invention is shown. Mobile switching center 10 of communication system 100 is coupled via a number of E1 or T1 links to a digital cross connect switch 15. Voice processing unit (VPU) 20 handles the conversion and transmission of all incoming and outgoing bearer traffic to the mobile switching center 10. Voice processing unit 20 is coupled to digital cross connect switch (DCS) 15 via two pairs of links or fiber connections. In the example shown in FIG. 1, a Sonet/SDH network element is the VPU 20 which includes two line terminal equipments 30 and 35. In prior automatic protection switching arrangements, each line equipment was coupled to the DCS by a working link and a protection link. That is, line terminal equipment 30 was coupled to DSC 15 via link 1A and 2A. As a result, while protecting against a fiber failure, if the line terminal equipment 30 failed, both working and protection links would be lost with corresponding bearer data.

In a preferred embodiment of the present invention, working OC3 links 1A and 1B have been grouped to handle bearer traffic for normal operation of the system. That is working OC3 links 1A and 1B are now employed to couple data transmission between line terminal equipment 30 and DCS 15. While four automatic protection switching OC3 links 2A and 2B couple line terminal equipment 35 to DCS 15. Both working link 1A and protection link 2A receive the same bearer traffic. Similarly, working OC3 link 1B and protection OC3 link 2B receive the same bearer traffic.

Each OC-3 compatible line terminal equipment 30 and 35 may handle up to 2016 channels of bearer traffic on 1A and another 2016 channels on 1B. Bearer payload processors 50, 51, 52 through N receive and transmit bearer traffic from base stations and other telecommunication equipment. Each bearer payload processor (BPP) 50, for example, is coupled to both line terminal equipment 30 and to line terminal equipment 35. Each BPP 50 transmits the same stream of bearer traffic to line terminal equipments 30 and 35. Each line terminal equipment inhibits downstream BPPs from regarding the protection OC3 links 2A and 2B from DCS 15. Normal operations involve BPPs regarding only data forwarded from the working line terminal equipment interface.

Since working OC3 link 1A and protection OC3 link 2A connect different line terminal equipments 30 and 35 respectively to the DCS, a single failure will not remove both the working and protection link, as was the case with the prior art. In general, the working link 1A and protection link 2A are both capable of transmitting the same data through the DCS 15 to the mobile switching center 10.

In a preferred embodiment of the present invention the working OC3 link and protection OC3 link (1A and 2A) are split to different line terminal equipments 30 and 35.

This not only provides for fault recovery of a cut OC3 link but provides for recovery for a fault in the line terminal equipment. The prior art automatic protection switching did not address line terminal equipment faults. Further, since each bearer payload processor 50-N is cross coupled to both line terminal equipments 30 and 35 via a High-speed Circuit Interface (HCI) interface 40. In a preferred embodiment of the present invention not only will the OC3 link failure and line terminal equipment failure be detected and the faulty units switched out of service, but the arrangement of the preferred embodiment will detect interfaces in the HCI interface and the bearer payload processors.

Thus, the automatic protection switching has working OC3 links on separate line terminal equipments from protection OC3 links. When a cut in the OC3 link cable is detected the preferred embodiment of the present invention will automatically route bearer traffic from link 1A to link 2A, for example.

Figure 2:
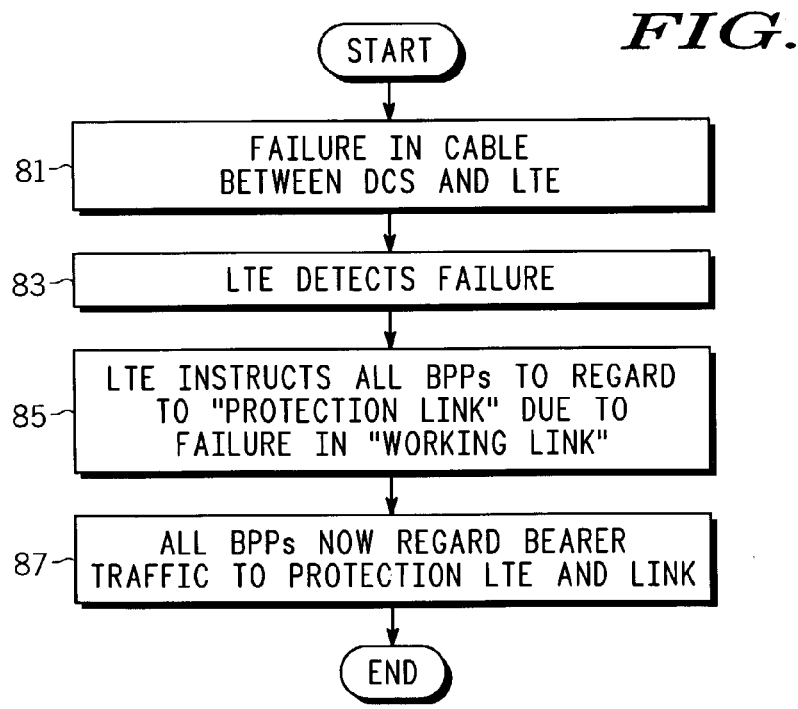
FIG. 2 is a flow chart of a fault recovery for a failure in accordance with the present invention.

Referring to FIG. 1 and in addition to FIG. 2 which is a flow chart describing the system processing for fault detection of a break or malfunction in an OC3 link. A break in an OC3 link generates the process of FIG. 2 and block 81 is entered. A failure occurs in the OC3 link or cable 1A which connects LTE 30 to DCS 15. Since the line terminal equipment 30 and the DCS 15 acknowledge the reception and transmission of data to one another, the LTE 30 will detect a break in the OC3 link 1A, for example by failure of an acknowledgment to transmitted data, block 83.

Since line terminal equipment 30 has detected a failure in link 1A, LTE 30 instructs each of the bearer payload processors 50-N to switch to the protection link 2A due to a failure in working link 1A, block 85. As a result, each BPP 50-N switches its connection from LTE 30 to LTE 35 through HCI interface 40 and utilizes OC3 link 2A to send the bearer traffic through DCS 15 to mobile switching center 10, block 87. Traffic now flows from BPPs 50-N through LTE 35 via OC3 link 1A through DCS 15 to mobile switching center 10. Since both LTEs 30 and 35 were receiving the same data, the automatic protection switch over described above is completed without the loss of any bearer traffic. The process is then ended.

Figure 3:
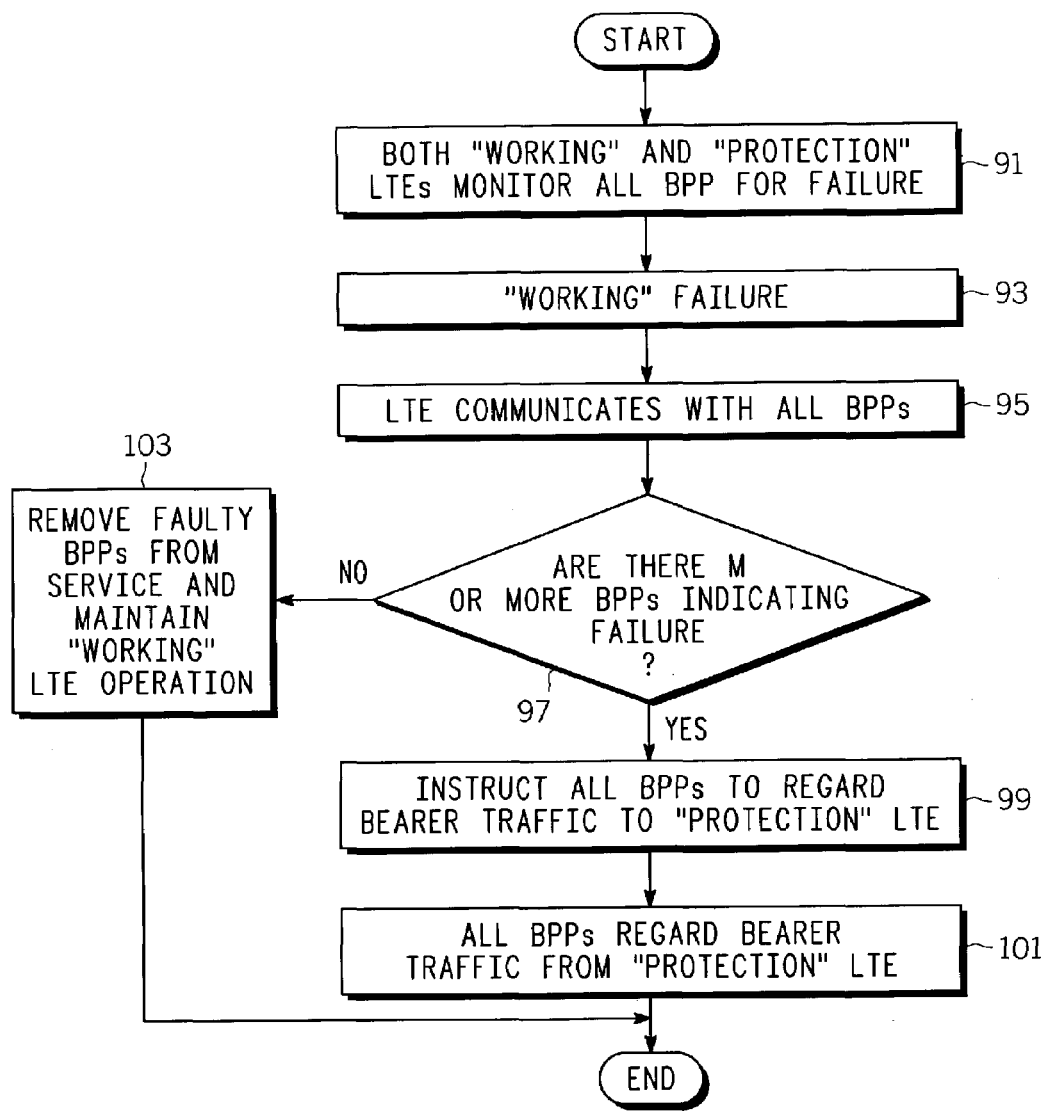
FIG. 3 is a flow chart of automatic protection switching for an alternate fault in accordance with the present invention.

In addition, to provide automatic protection switching for failures in the line terminal equipment HCI interface or bearer payload processors, the method shown in the flow chart of FIG. 3 is implemented in each line terminal equipment 30 and 35. Now referring to FIGS. 1 and 3 collectively, an extended automatic protection switching arrangement is shown.

The extended automatic protection switching arrangement is started and block 91 is entered. Both the working LTE 30 and the protection LTE 35, for example, monitor the bearer traffic transmitted via the HCI 40 to the line terminal equipment for each of the bearer payload processors 50-N. Again, since there is hand shaking between the LTE and each of the BPPs next, a failure is detected in the working traffic flow, block 93. That is either the working LTE, HCI interface or a bearer payload processor fails.

Since each BPP 50-N transmits bearer traffic to both LTEs 30 and 35, each LTE monitors the communication with all BPPs 50-N, block 95. Under normal working conditions the working LTE 30, for example, will receive indications from each BPP that bearer traffic is being transmitted normally. In addition the protection LTE 35 will receive these same indications from each of the BPPs. If a single BPP fails or the corresponding HCI interface fails, that particular BPP will be switched to regard the protection LTE removed from service. That is, only one or the other of the line terminal equipment is looked-at or regarded. The protection LTE 35, for example, is also checking each BPPs' status for failures. Since both LTEs are checking all BPPs a failure in the working LTE will be seen as multiple failures in the BPPs. This situation may be thought of as a "heartbeat" detection by the protection LTE of the working LTE. That is if an LTE fails, its lack of a working functional status or "heartbeat" will be detected by the protection LTE. An indication of a lack of a "heartbeat" or failure of an LTE would be several BPPs indicating failure.

As a result block 97 determines whether there are M or more BPPs indicating failures. If not, block 97 transfers control to block 103 via the "no" path. Block 103 declares the single BPP indicating failure as failed and preserves operation on existing working LTE. Then the process is ended.

If there are M or more BPPs indicating failure, block 97 transfers control to block 99 via the "yes" path. Typically there may be as many as 15 BPPs connected to an LTE. The parameter M upon which the "heartbeat" detection is performed may be set between two and 15 in a preferred embodiment of the invention and is selected to be two BPPs indicating failure.

Since the protection LTE has detected M or more BPPs indicating failure, LTE 35 instructs all BPPs to regard the bearer traffic from LTE 35, block 99. Lastly, all BPPs 50-N now regard bearer traffic from the protection LTE 35 through protection link 2A, via DCS 15 from mobile switching center 10 and previously working LTE 30 and link 1A are indicated as requiring service, block 101. The process is then ended.

The present invention as described above extends basic automatic protection switching further than just connecting cables or links, such as OC3 links. Detection and protection from fault is afforded also to the line terminal equipment, any interface connections between the line terminal equipment and the bearer payload processors as well. Present automatic protection switching is deficient for recovering from any faults other than a link fault or severance. With the present invention detection, protection and recovery of faults is attainable for each of the processors and interconnections for transmitting bearer traffic to the mobile switching center.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. An automatic protection method for a communication system having a switching center coupled to line equipment, the automatic protection method comprising the steps of:
   providing a working link for transmitting bearer traffic between the switching center and a first line terminal equipment;
   providing a protection link for selectively transmitting bearer traffic between the switching center and a second line terminal equipment;
   receiving by the first and second line terminal equipment bearer traffic from a plurality of bearer payload processors;
   monitoring by the first and second line terminal equipment each of the plurality of bearer payload processors for failures;
   obtaining by the second line terminal equipment a failure indication for each of the plurality of bearer payload processors;
   determining whether there is a predetermined number or greater of failures among the plurality of bearer payload processors, wherein if a number of failures of the plurality of bearer payload processors is greater than or equal to the predetermined number, there is further included a step of switching the bearer traffic from the working link to the protection link, wherein if the number of failures of the plurality of bearer payload processors is less than the predetermined number, there is further included steps of:
   removing faulty bearer payload processors from service; and
   maintaining operation of non-faulty bearer payload processor on the working link.

* * * * *